US011915556B2

(12) United States Patent
Amaitis et al.

(10) Patent No.: US 11,915,556 B2
(45) Date of Patent: *Feb. 27, 2024

(54) POINT AND/OR MONEY BASED GAMING

(71) Applicant: INTERACTIVE GAMES LLC, New York, NY (US)

(72) Inventors: Lee Amaitis, Las Vegas, NV (US); Paul Williams, Washington, DC (US); Nolan Glantz, Burlington, MA (US)

(73) Assignee: INTERACTIVE GAMES LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/699,283

(22) Filed: Mar. 21, 2022

(65) Prior Publication Data

US 2022/0207960 A1 Jun. 30, 2022

Related U.S. Application Data

(63) Continuation of application No. 16/993,423, filed on Aug. 14, 2020, now Pat. No. 11,282,338, which is a continuation of application No. 16/140,141, filed on Sep. 24, 2018, now Pat. No. 10,748,380, which is a continuation of application No. 14/467,678, filed on Aug. 25, 2014, now Pat. No. 10,083,574, which is a continuation of application No. 13/689,218, filed on Nov. 29, 2012, now Pat. No. 8,814,664.

(60) Provisional application No. 61/656,232, filed on Jun. 6, 2012.

(51) Int. Cl.

| | |
|---|---|
| ***G07F 17/32*** | (2006.01) |
| ***A63F 9/24*** | (2006.01) |

(52) U.S. Cl.

CPC ............ *G07F 17/3244* (2013.01); *A63F 9/24* (2013.01); *G07F 17/3293* (2013.01)

(58) Field of Classification Search

CPC .. G07F 17/32; G07F 17/3223; G07F 17/3227; G07F 17/3237; G07F 17/3241; G07F 17/3244; G07F 17/3248; G07F 17/3288; G07F 17/3293; G07F 17/34; A63F 9/24

See application file for complete search history.

(56) References Cited

U.S. PATENT DOCUMENTS

| | | | | |
|---|---|---|---|---|
| 6,688,978 B1 | 2/2004 | Herman | | |
| 7,229,354 B2 * | 6/2007 | McNutt | H04N 21/254 348/E7.071 | |
| 7,510,474 B2 * | 3/2009 | Carter, Sr. | G07F 17/3223 463/16 | |
| 8,216,072 B2 * | 7/2012 | Curtis | G07F 17/3279 463/29 | |

(Continued)

FOREIGN PATENT DOCUMENTS

| | | |
|---|---|---|
| CN | 1609864 | 4/2005 |
| TW | 201016286 | 5/2010 |

(Continued)

*Primary Examiner* — Milap Shah

(57) ABSTRACT

Some embodiments may include a poker indexing service. For example, a multi-dimensional vector of player performance and/or other data may be determined based on gaming related activity that is input or otherwise captured. Such a vector may be used in various forms to generate a metric or to facilitate wagering and/or other gaming activity. Other methods and apparatus are described.

20 Claims, 6 Drawing Sheets

(56) References Cited

U.S. PATENT DOCUMENTS 8,221,241 B2 * 7/2012 Davis .................. G07F 17/3276 463/28
8,814,664 B2 * 8/2014 Amaitis .................... A63F 9/24 463/25
10,332,201 B1 * 6/2019 Kunz ..................... G06Q 20/00
10,748,380 B2 * 8/2020 Amaitis .............. G07F 17/3293
11,282,338 B2 * 3/2022 Amaitis .............. G07F 17/3293
2004/0058731 A1 * 3/2004 Rossides ................ G06Q 50/34 463/42
2004/0128157 A1 * 7/2004 Aquilino ................ G06Q 30/02 463/25
2004/0266530 A1 12/2004 Bishop
2005/0181869 A1 8/2005 Downes P.E.
2005/0261043 A1 * 11/2005 Slade ...................... G07F 17/32 463/1
2007/0265092 A1 * 11/2007 Betteridge .............. G07F 17/32 463/42
2008/0026827 A1 * 1/2008 Skotarczak ............. G07F 17/32 463/25
2008/0039192 A1 * 2/2008 Laut ....................... G06Q 30/00 463/25
2008/0076572 A1 * 3/2008 Nguyen .............. G07F 17/3237 463/42
2008/0102956 A1 * 5/2008 Burman ................ H04L 63/104 463/42
2008/0161113 A1 7/2008 Hansen et al.
2008/0254876 A1 10/2008 Koustas et al.
2008/0311994 A1 * 12/2008 Amaitis .............. G07F 17/3239 463/42
2009/0023495 A1 1/2009 Koustas et al.
2009/0026706 A1 1/2009 St. Clair et al.
2009/0176559 A1 * 7/2009 Buchholz ................ G07F 17/32 463/25
2009/0203447 A2 8/2009 Hansen et al.
2010/0069144 A1 * 3/2010 Curtis ..................... G07F 17/32 463/25
2010/0285857 A1 * 11/2010 Anderson ............... G07F 17/32 463/9
2010/0311484 A1 12/2010 Suh et al.
2011/0034252 A1 * 2/2011 Morrison ............ G07F 17/3223 463/43
2012/0009984 A1 * 1/2012 Amaitis .............. G07F 17/3237 463/4
2012/0015735 A1 * 1/2012 Abouchar ........... G07F 17/3237 463/42
2012/0046096 A1 * 2/2012 Morrison ............ G07F 17/3237 463/25
2012/0142411 A1 * 6/2012 Thompson ............ A63F 13/828 463/25
2013/0084962 A1 * 4/2013 Radisich ............. G07F 17/3255 463/25
2013/0084994 A1 * 4/2013 Farrar ................. G07F 17/3244 463/42
2013/0331967 A1 12/2013 Amaitis et al.
2017/0256141 A1 9/2017 Simons et al.
2021/0077909 A1 3/2021 Butz et al.
2021/0319653 A1 10/2021 Isgar

FOREIGN PATENT DOCUMENTS

TW 201208748 3/2012
WO 2010019541 2/2010
WO 2012025779 3/2012

* cited by examiner

FIG. 2
CANTOR
SATURDAY MARCH 10, 2012
ODDS TO WIN
SPREAD
POINTS TOTAL
SATURDAY MARCH 17, 2012
ODDS TO WIN
SPREAD
POINTS TOTAL
SATURDAY MARCH 24, 2012
SUBMIT CHALLENGES
This is a ticker it will display game info

FIG. 3
AMOUNT TO PLAY
TO WIN
XP11
CLEAR
NEXT

POINT AND/OR MONEY BASED GAMING

CROSS-REFERENCE TO RELATED APPLICATIONS

This application is a continuation of U.S. patent application Ser. No. 16/993,423 filed Aug. 14, 2020, which is a continuation of U.S. patent application Ser. No. 16/140,141 filed Sep. 24, 2018 (now U.S. Pat. No. 10,748,380 issued on Aug. 18, 2020), which is a continuation of U.S. patent application Ser. No. 14/467,678 filed Aug. 25, 2014 (now U.S. Pat. No. 10,083,574 issued on Sep. 25, 2018), which is a continuation of U.S. patent application Ser. No. 13/689,218 filed Nov. 29, 2012 (now U.S. Pat. No. 8,814,664 issued on Aug. 26, 2014), which claims priority to U.S. provisional application 61/656,232 filed on Jun. 6, 2012, each of which are hereby incorporated herein by reference it is entirety.

FIELD

Some embodiments may relate to sports wagering, casino wagering, event wagering, free play, subscription wagering services, point-based wagering, and so on.

BACKGROUND

Traditional wagering may involve risking an amount of money for the potential of winning a greater amount of money. The outcome of a wager may be based on the occurrence of an event.

SUMMARY

Figure 1:
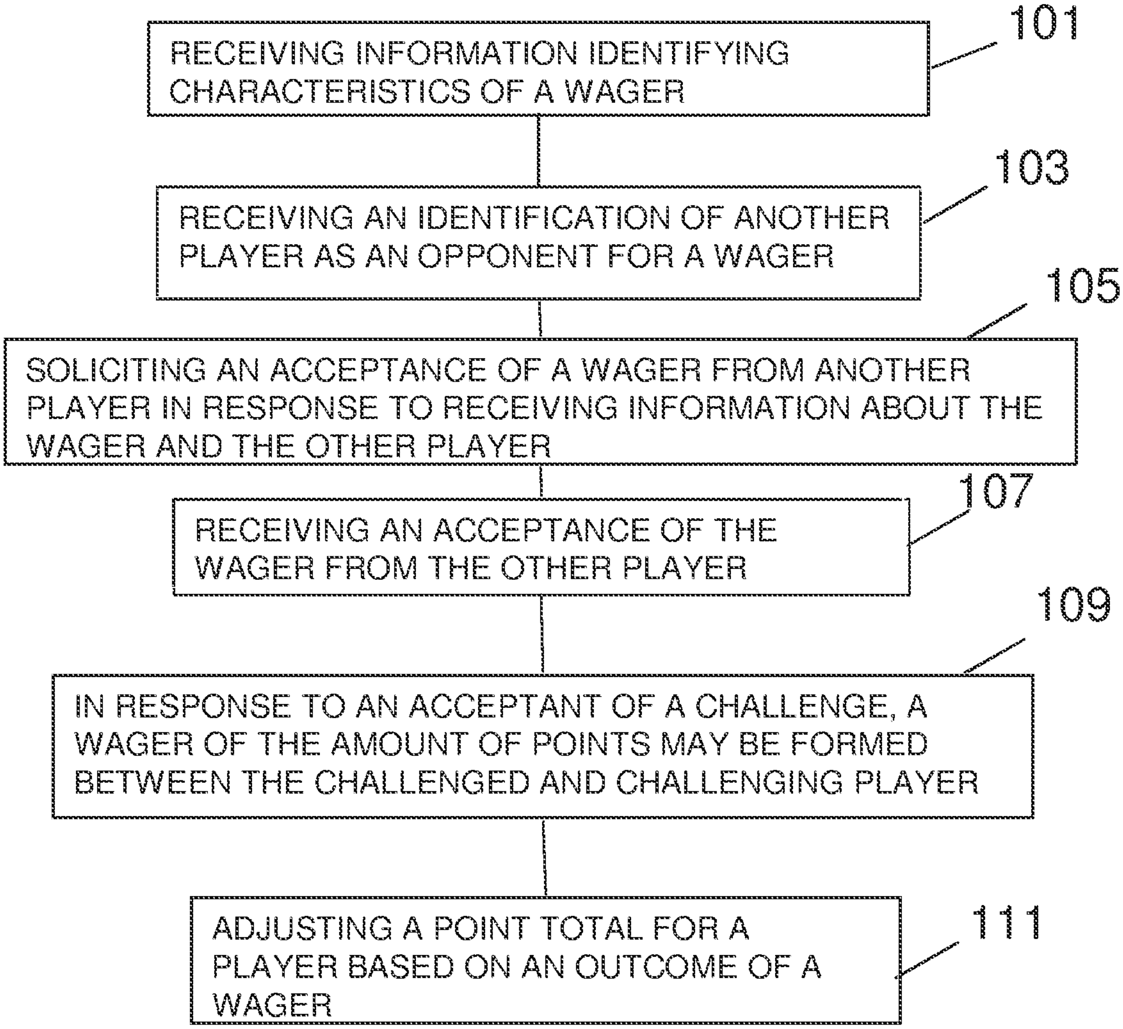
FIG. 1 shows an example method that may be performed in some embodiments.

The following should be understood to be embodiments, not claims.

A. A method comprising: determining, by a computing device, that a mobile device associated with a first player is located in a first location that is designated as a point wagering area; in response to determining that the mobile device is located in the first location, enabling point wagering and disabling monetary wagering from the mobile device; receiving, by the computing device from the mobile device, a challenge by the first player, in which the challenge identifies an amount of points and a second player against whom to place the challenge; in response to receiving the challenge, identifying, by the computing device, the challenge to the second player; receiving, by the computing device, an acceptance of the challenge from the second player; in response to receiving the acceptance, forming, by the computing device, a wager between the first player and the second player based on the challenge; adjusting, by the computing device, points in an account of a winning player of the challenge in response to determining the outcome of the challenge; determining, by the computing device, mobile device is located in a second location that is designated as a monetary wagering area; and in response to determining that the mobile device is located in the second location, enabling monetary wagering and disabling points wagering from the mobile device.

A.1. The method of claim A, comprising: receiving, by the computing device from the mobile device, a second challenge by the first player, in which the second challenge identifies a penalty and the second player against whom to place the challenge; in response to receiving the second challenge, identifying, by the computing device, the second challenge to the second player; receiving, by the computing device, a second acceptance of the second challenge from the second player; in response to receiving the second acceptance, forming, by the computing device, a second wager between the first player and the second player based on the second challenge; and imposing, by the computing device, the penalty on the losing player of the second challenge in response to determining a second outcome of the second challenge.

A.2. The method of claim A, in which the challenge includes a fantasy sports challenge, in which the first player identifies a first fantasy team for the fantasy sports challenge, in which the second player identifies a second fantasy team for the fantasy sports challenge, in which the computing device determines an odds for the fantasy sports challenge in response to the identifying of the first fantasy team and the second fantasy team based on historical performance of members of each of the first fantasy team and the second fantasy team in real sporting events.

DETAILED DESCRIPTION

I. Example Embodiments

Some embodiments may allow players to play games for non-monetary rewards and/or monetary rewards. Play of the game may require a risk or payment of some monetary amount and/or some element that may be obtained with a monetary value (e.g., a token, purchased points). A non-monetary reward may include an award of points that may not be redeemed for cash or other goods or services, a penalty applied to another player, and/or any other sort of non-monetary bonus or award as desired. A monetary reward may include a cash credit, a credit of something that may be exchange for cash and/or used to buy goods and/or services, and so on. A game may include a wagering game such as a sports wagering game, a casino wagering game, a multi-player game, a video game, a single player game, a lottery, and so on. Play of such a game may include risking some amount of monetary and/or non-monetary elements in hopes of obtaining some amount of monetary and/or non-monetary elements by winning the game.

Some embodiments may include wagering between a player and a house and/or wagering between two or more players. A house may set wagering parameters such as odds, amounts wagered, available wagers, and so on. Players may define wagering parameters, such as odds, amounts wagered, selected wagers, and so on. Some embodiments may include a social networking component that allows friends to wager with one another. For example, a proprietary social network may allow players to track friends in a gaming environment (e.g., by adding aliases, emails, names, etc. to a friends list). Some embodiments may interface with another social network such as Facebook to allow players to wager with friends in that social network (e.g., through APIs, as a Facebook game).

Some embodiments may advantageously allow players to train in sports betting without some of the risk of traditional sports betting. Some embodiments may advantageously allow additional types of wagering that may not be available for monetary wagers. Some embodiments may advantageously provide a new form of entertainment to a group of friends.

Points Wagering Examples

Some embodiments may include risking an amount of non-monetary elements in a game. Such non-monetary elements may be referred to herein as points, but it should be recognized that some points may have monetary value, and that other things may not have monetary value, and so the name used to refer to such an element is not definitive.

FIG. 1 illustrates an example method that may be used in some embodiments involving points wagering. Some wagering may include a wager against a house. Some wagering may include a wager against another one or more players. Wagering may involve actions such as the actions of FIG. 1 performed by one or more computing devices, such as a gaming server operated by a gaming provider that provides gaming functionality to one or more players and/or devices.

Figure 2:
FIG. 2 shows an example interface that may be used in some embodiments.

Some embodiment may include providing an interface through which one or more users may wager points. FIG. 2 illustrates one such example interface. Such an interface maybe transmitted (e.g., from a gaming server) to users that access a gaming service. A user may operate controls of such an interface in order to explore offered wagers, view wager related information, view account information, manage wagers, manage accounts, enter into wagers, and so on. Controls may include, for example buttons (e.g., touch screen buttons, physical buttons, etc.) and or other controls that may be operated in any manner by a user.

As illustrated, various information about waging may be displayed in such an interface. For example, odds, bet requirements, bet characteristics, active bets, bet history, friends, and so on may be displayed. Such information may be determined by a gaming service (e.g., odds may be calculated based on historic data, based on expected outcomes of an event, and so on; game characteristics may be determined based on data about upcoming games such as who the participants in an upcoming football game will be or when the game will be held; requirements may be determined to meet gaming service rules such as a minimum amount of a bet and so on). It should be recognized that any information that may facilitate wagering may be displayed in such an interface and determined in any desired manner.

As illustrated in FIG. 2, some embodiments may include navigation controls that allow a user to select wager types and/or information types for display. A user may operate such controls (e.g., click/tap a button). In response to operation of such controls, information related to the controls (e.g., selected game types, selected information types, selected action) may be transmitted for display through such an interface.

As illustrated in FIG. 2, some embodiments may include wagering controls that may be operated by a user to enter a wager. Operation of the controls may be interpreted by a device through which the interface is being displayed. Information regarding the interpretation and/or operation of the control may be transmitted to a gaming service. For example, if a user clicks on a button to select to wager on an underdog in an Oakland vs North Dakota game then a request to place such a wager may be sent to a gaming service. Some embodiments may include steps such as confirmation or further data entry before and/or after such information is transmitted.

Figure 3:
FIG. 3 shows an example interface that may be used in some embodiments.

As illustrated in FIG. 3, some embodiment may include one or more interfaces through which wager information may be entered and/or confirmed. For example, in the illustrated interface, a player may enter points to be wagered and shown an amount of points possibly won for winning the wager previously selected in the interface of FIG. 2. It should be recognized that any interfaces may be used to further define and/or refine and/or confirm any characteristics of a wager.

Some embodiments, as indicated at block 101 of FIG. 1, may include receiving information identifying characteristics of a wager. For example, a gaming server may receive information that identifies one or more parameters of a desired wager (e.g., an amount to points to be wagered, an event on which a wager is based, parameters that define a wager, opponent for a wager, and so on). Such information may be stored and/or processed so that a wager may be established defined by the parameters, history of wagers may be obtained, outcomes of wagers may be determined, and so on.

Wager Against a House Examples

Figure 4:
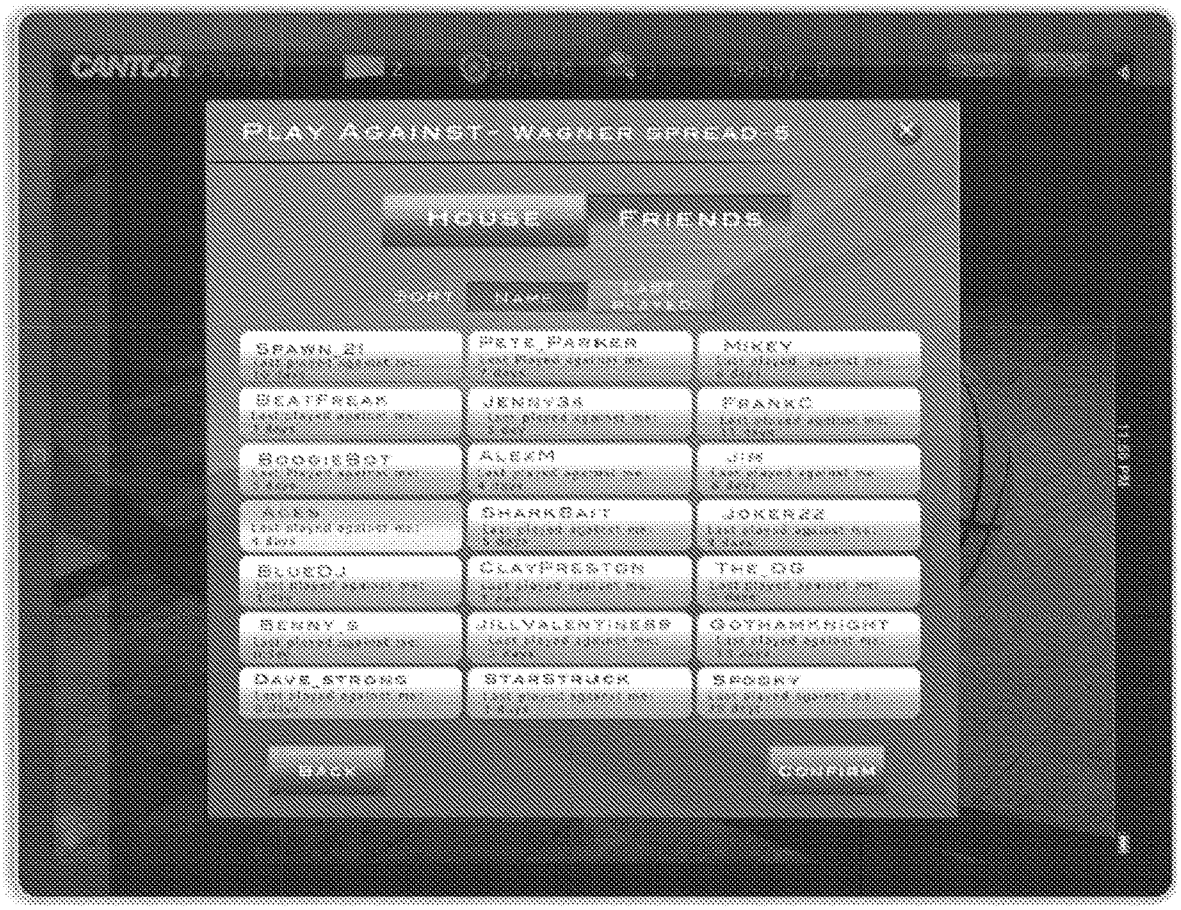
FIG. 4 shows an example interface that may be used in some embodiments.

As illustrated in FIG. 4, some embodiments may include an interface through which a user may select an opponent for a wager. In some embodiments this may be inferred from a wagering option selected through a main interface (e.g., an interface of FIG. 2). In some embodiments the main interface may be used to select some characteristics of a wager (e.g., event, odds, etc.) that may apply to future selected opponents. The ordering of selected opponents, odds, sides, and amounts may be rearranged in any manner as desired through any interfaces.

Through an interface such as that of FIG. 4, a player may choose to place a wager of an amount of points against a house. For example, a player may select the house option and select the confirm control. Information about such an opponent may be submitted to a gaming service (e.g., transmitted from a mobile gaming device to a gaming server).

A gaming service (e.g., a gaming server) may receive information defining an opponent to a wager (e.g., together with and/or separately from other information that may define a wager). The information may identify that the opponent for a wager is a house. A gaming server may determine an opponent for a wager based on that received information and may establish a wager and/or attempt to establish a wager in response. A house may automatically accept wagers entered in this manner. Up to some cut off or wager amount or whatever restriction is applied at the house.

Wagering Against Another Player Examples

As illustrated in FIG. 4, some embodiments may include an interface through which a user may select an opponent for a wager. In some embodiments this may be inferred from a wagering option selected through a main interface (e.g., an interface of FIG. 2). In some embodiments the main interface may be used to select some characteristics of a wager (e.g., event, odds, etc.) that may apply to future selected opponents. The ordering of selected opponents, odds, sides, and amounts may be rearranged in any manner as desired through any interfaces.

Through an interface such as that of FIG. 4, a player may choose to place a wager of an amount of points against another player. For example, a player may select the friends option, select one or more friends and select the confirm control. Information about such an opponent may be submitted to a gaming service (e.g., transmitted from a mobile gaming device to a gaming server). A listing of friends (e.g., people in a player's social network) may be displayed. The player may select one or more opponents from those friends. The listing of friends may be sorting in various manners that may be selected by a player. For example, a player may select to sort by name, by last played against, by most played against, and so on.

Some embodiments may include populating a listing of potential opponents. For example, such a listing may be populated based on friends of a player to include those friends of the player (e.g., people on a friend list or in a social network of the player). Some embodiments may include filtering one or more people out of such a list of potential opponents. For example, if a potential opponent does not have enough points to make a wager (e.g., has fewer points than the wager is for) then the player may not be shown in the list.

A gaming service (e.g., a gaming server) may receive information defining an opponent to a wager (e.g., together with and/or separately from other information that may define a wager). The information may identify that the opponent for a wager is a house. A gaming server may determine an opponent for a wager based on that received information and may establish a wager and/or attempt to establish a wager in response. For example, as illustrated at block 103, some embodiments may include receiving an identification of another player as an opponent for a wager.

Figure 5:
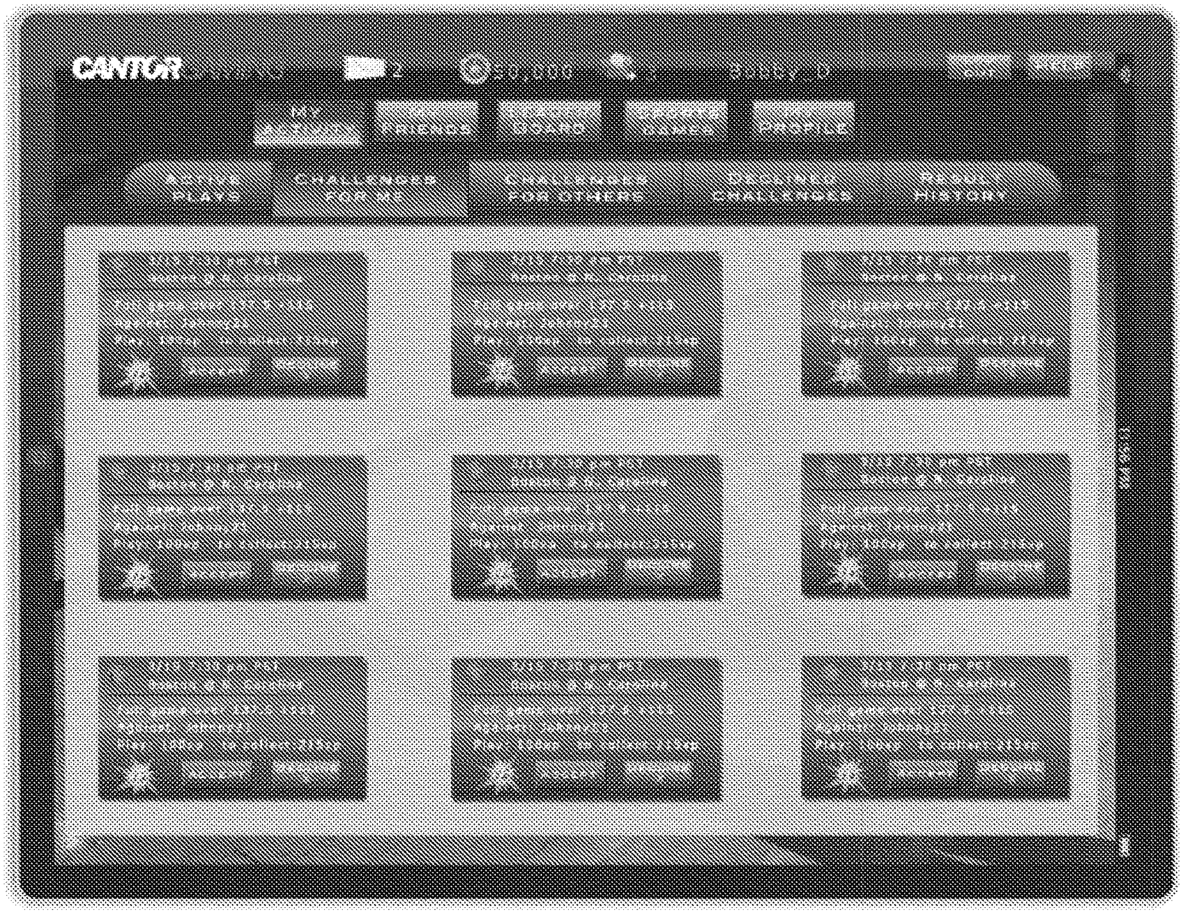
FIG. 5 shows an example interface that may be used in some embodiments.

A wager against another player may be referred to as a challenge. The other player may be offered the challenge through an interface. For example, FIG. 5 illustrates a challenged player a list of incoming challenges. A challenged player may be shown information identifying challenges made to the challenged player by other players. The challenges may be ordered in any desired manner that may or may not be selected by the challenged player (e.g., time received, player name, etc.). Through such an interface, a player may accept or decline any number of challenges by operating a control.

As indicated at block 105, some embodiments may include soliciting an acceptance of a wager from another player in response to receiving information about the wager and the other player. Soliciting may include providing an interface such as that of FIG. 5 through which the other player may accept or decline the challenge. Soliciting may include presenting any information in any manner as desired.

As indicated at block 107, some embodiments may include receiving an acceptance of the wager from the other player (e.g., from a mobile device in response to a player clicking a confirm button). In some embodiments, in response to an acceptant of a challenge, a wager of the amount of points may be formed between the challenged and challenging player as indicated at block 109. Forming a wager may include entering information into a database, notifying players, auditing actions, recording actions, forming a binding agreement, enforcing a binding agreement, adjusting points, and so on.

Some embodiment may include receiving a rejection of a wager from the other player. In such a situation, no wager may be formed based on the challenge, points maybe returned to a player, and so on as desired.

It should be recognized that any number of players may be challenged simultaneously, and or in sequence in any manner as desired. For example, a player may enter one or more challenges before one or more other challenges have been accepted or declined. As another example, a player may choose multiple players as an opponent for a wager defined by other parameters and a challenge may be sent to all of those selected opponents.

In some embodiments, various parameters of a wager may be selected by a house and/or defined by a player in any combination as desired. For example, a house may set odds for a wager even between two players. In other embodiments one or the other of the players may set such odds and/or other parameters.

Wager Formation Examples

In some embodiments, in response to submitting information about a wager (e.g., a wager against a house and/or a challenge) an amount of wagered points may be subtracted from a player's point total. In other embodiments, such points may be subtracted in response to a formation of a wager and/or a loss of a wager instead. For example, a challenging player may have the points in a challenge removed in response to a challenged player accepting a challenge. In some embodiments, a challenged player may have points reduced in a challenged amount in response to accepting the challenge. If the challenged player declines a challenge, points may be returned to a challenging player if they were removed upon the challenge being made.

In some embodiments, a player may only wager points that are in their account. For example, a player may only send out and/or enter into challenges so that their point total does not get reduced to less than zero. For example, if a player has 1000 points in an account, the player may be prevented from placing a wager, accepting a challenge, and so on for an amount of points greater than 1000. In some embodiments, a player may not send out challenges that total more than the total points in their account. In some embodiments, they may send those challenges out, but challenges may not be accepted for more than that amount. For example, challenges may be canceled if others are accepted, or other wagers are entered into that reduce the points available to below the needed to enter into the challenge. Such cancelation may not apply in situations where the wagered amount is removed upon issuing a challenge rather than when a challenge is accepted.

Information about the wager maybe entered into a database so that it may be used for future outcome or information determination. For example, a database may store data about the wagers that may be viewed by a player in the future before and/or after a wager is resolved. The information may be used to resolve a wager (e.g., the information may identify which player or house is on which side of the wager, how many points are wagered, an event that the wager is based on, and so on).

Cost of Wagering Examples

In some embodiments, point wagering may be free and/or covered by some subscription cost. For example, a player may be able to enter into any number of wagers upon paying a monthly fee and/or signing up for a service with no cost per wager.

In some embodiments, one or more point wagering options may be tied to some cost. For example, in some embodiments, a player may be required to pay some cost to enter into a wager. A cost may include a cost of points and/or a cost of money. In one example, a player may pay for wagers with tokens. Tokens may represent actual cash. A player may purchase tokens for money. For example—$0.99 to buy 100 tokens, $2.99 to buy 500 tokens, $4.99 to buy 1000 tokens. In some embodiments, rather than tokens, actual cash may be used.

Each wager by the player may cost some number of tokens. A wager against the house may cost the player more or less than a challenge. A challenge may cost all players involved in the challenge the amount of tokens. The amount may be more or less for a challenged than a challenger. An amount of a wager may affect points so that larger wagers may cost more tokens. In some embodiments, a wager type may affect the cost (e.g., a parlay wager may be more expensive than a standard wager). In some embodiments, a losing player may pay for the wager rather than both people being charged.

In some embodiments, points used as a basis for a wager may be used to pay for a wager. For example, there may be some conversion mechanism from points to tokens. As another example, actual point may be used instead of tokens or cash. Points may be purchased for cash in some embodiments.

In response to receiving information about a wager and/or forming a wager, a balance of tokens and/or other elements may be adjusted as a cost of placing the wager. Such an adjustment may include adjusting a database entry in which a balance is maintained.

Wager Outcome Examples

In various embodiments, a wager may be based on any desired event. For example, a wager may include an in running wager (a wager made during an event), a pre-game wager, a wager based on an outcome of an event, a wager based on a happening within an event (e.g., a card being drawn, a run being scored, a ball being hit), a sporting event, a video game, a political event, a casino game, and so on.

In some embodiments, a gaming server may obtain information about upcoming events, process that information, present wagering options related to those events, and form wagers that are based on those events. In some embodiments, a gaming server may receive information from which the outcomes of events and/or wagers based on the events may be determined. For example, such information may include the outcomes of events, happenings in a game, a data stream of occurrences in an event, and so on. In response to receiving such information, a gaming server may determine wager outcomes for wagers that are based on the information. For example, information may identify that team X won a game on which 25 wagers are based. A database may be referenced to find all wagers based on the game and the wagers may be resolved based on team X winning (e.g., people that bet on team X may be winners and those that bet against team X may be losers).

As indicated at block 111, some embodiments may include adjusting a point total for a player based on an outcome of a wager. For example, a winning player may have his point total increase in response to winning a wager. The amount of the increase may be based on an odds of the wager and an amount wagered. A database may be adjusted to maintain the balance of points in response to a determination of an outcome of a wager.

Group, Competition, and/or Leaderboard Examples

In some embodiments, players may want to earn points to show their prowess in gaming. A leaderboard may be maintained and/or published so that well performing players may receive public recognition of their performance. A leaderboard may be a board that references a particular time (e.g., last week, moving period of months, a particular month) and/or group (e.g., social network of a person) and/or an all-time board. For example, weekly and/or daily leader board may be maintained and/or published. In some embodiments, a leaderboard maybe based on a social network. For example, a leaderboard may show friends and/or members of a social network that have a leading point total. Accordingly, each player may be shown a different leaderboard that is based on that specific player's social network or friends. A gaming server may determine a social network and/or a leader board based on stored information about players and/or those players wagering activities (e.g., a player social network may be determined, players in that social network may have their point totals determined, those players may be ranked based on their point totals, and the outcome in order may be shown to the player).

Some embodiments may include a jackpot and/or tournament that may relate to points earned. For example, a tournament over a week may take place and earn the winner or person that earned the most point or ended with the most points at the end of the week with a jackpot. A leader of a leaderboard may be awarded in response to leading the leaderboard at some end point.

Cantor 5/7 and/or Fantasy Examples

Some embodiments may include fantasy event wagering between a house and a player or between/among players. One example of fantasy sports wagering is described in U.S. patent application 61/602,849, which is incorporated herein by reference.

In some embodiments, a player may identify a team and issue a fantasy challenge based on that team to another player. A gaming server may receive the information identifying the team and the other player and an amount of points and issue the challenge to the other player in response.

In some embodiments, the other player may be presented with an interface that allows selection of an opposing team to enter the challenge. The other player may identify his team and may accept the challenge (or may decline the challenge). A gaming server may receive an acceptance and/or an indication of a team from the other player. In response, the gaming server may determine odds and/or other parameters for the wager and form the wager with those odds or other parameters. The odd maybe determined based on expected performance of the two teams based on historical performance of the members of the teams. Accordingly, the challenging player may be entering into a sort of blind wager without knowing in the odds but can be confident that the house will make fair odds based on its track record of odds setting. In other embodiments, the challenging player may be able to confirm or deny a wager after the odds are determined so that a wager is formed in response to the challenging player confirming the challenge after the other player selects his team and the odds are set.

Outcome of the fantasy wager may be determined based on actual events in actual games that may be converted to points in the fantasy game. For example, for each hit in a real baseball game that a member of one player's fantasy team, the player may be granted a fantasy point. The player with the most fantasy points may win the fantasy challenge. It should be recognized that any manner of scoring a fantasy wager may be used.

Monetary Wagering Examples

Some embodiments may include monetary wagering. Some examples of monetary wagering are given in U.S. application 61/604,115, which is hereby incorporated herein by reference. Wagering may take one or more forms that may be similar to points wagering (e.g., wagering on games, risking money for more money, wagering against a house, wagering based on challenges to other players, etc.). Rather than points, money may be used. Such money may be stored in an account (e.g., similar to points being stored). Wagering with money may or may not include a cost for placing a wager (e.g., use of token).

In some embodiments, a player may choose to use points or money to place wagers. Such a choice may be made based on an account that a user signs in with (e.g., a points account vs a money account), a location, a selection of an account from which to wager, and so on. A player may switch back and forth between point or monetary wagering as desired in some embodiments. A single or multiple different applications (e.g., software on a device) may be operated to facilitate such wagering (e.g., one application for both types of wagering, a different application for each type of wagering).

A single or multiple gaming servers may be used for both types of wagering (e.g., a single gaming server that can do both, a different server for each type).

Monetary wagering may be restricted based on any desired legal requirements. For example, monetary wagering may be limited to house wagering, location limitations, age limitations, wager type limitations, and so on.

It should be recognized that wagering with money may take any form that may be similar or different than wagering with points. Outcomes of monetary wagers may be determined, and monetary accounts may be adjusted accordingly.

Location Examples

Some embodiments may include enabling, disable, and/or switching functionality based on a location of a player and/or device. For example, monetary wagering may be disabled in certain locations, points wagering may be disabled in certain locations, and so on.

Some embodiments may include determining a location of a play errand/or device being used to wager or access a gaming service. U.S. application 61/604,115, which has already been incorporated herein by reference gives various examples of location determination of a device. For example, a mobile device may have a location determined using geofencing, GPS, triangulation, and so on. Such a determination may take place periodically, in response to a login, wager, and/or other event.

A determination of functionality that should be allowed, disallowed, switched to, and so on may be made based on the determined location. For example, a table of locations and functionalities and/or action that are allowed and/or should be taken when a device is in the location may be maintained and referenced in response to a location determination. In response to such a determination, an action may be taken, a function maybe disallowed, function may be allowed, and so on by a gaming server and/or device accessing the gaming server.

In one example, a player's device may include an interface that may be changed from allowing points wagering and not monetary wagering to allowing monetary wagering but not points wagering in response to a location determination. Such a location determination may include a determination that a player is in a casino, in a jurisdiction where monetary wagering is legal, and so on. Points wagering may not be allowed in such a jurisdiction or may be depending on the desire of a gaming service operator. When a player leaves such an area and a determination is made that the player is not in that location, the player may have an interface changed to allow points wagering but not monetary wagering. Such a switch may change a default in some embodiments (e.g., a switch from points to money wagering as a default bet but may still allow the other type of wagering). In some embodiments, a single application may switch which account wagering is occurring from seamlessly as the user changes locations. Such changing may allow a user to conveniently use a gaming service form multiple locations that may have different laws or preferences.

Penalty As Rewards Examples

Some embodiments may include wagering for an ability to impose a penalty. Such wagering may be similar to point wagering against another player. For example, a player may challenge another player to a wager with the winner being able to impose some penalty on the loser (e.g., an identified penalty at the wagering time in lieu of points, a penalty that can be traded for points, and so on).

Some embodiments may include a piece of software that imposes a penalty on a player. For example, a background application may run on an Android device. The background application may communicate with a wagering application to receive penalty information and impose those penalties through the device (e.g., change a ring tone, accessing an operating system API).

Imposing a penalty may include controlling a computing device, such as a mobile phone, to operate in a manner differently than desired by a player. For example, in some embodiments a penalty may include a ring tone change, a background change, wager options changing, website options changing, screen names changing, avatar changes, quotes being added to a profile, friends being removed or added from a social network, control over statuses on Facebook or some other website, blocking of a website or other internet resource, redirecting traffic to a website, volume adjustment, locking or making a device unavailable, changing a voicemail message or functionality, text messaging block out or auto responses, any control of any aspect as desired.

Some embodiments may include an interface similar to a points wagering interface where a user may identify wagering parameters to issue a challenge. One wagering parameter may include selecting a penalty from a set of possible penalties. The parameters may be identified to a challenged player. Selecting a penalty may include selecting a time frame for the penalty to be imposed (e.g., a ring tone for 5 days, a ring tone for 5 calls, etc.) and/or a standard set of time frames may be used.

In some embodiments, players may pick the penalty by spending points. (e.g., wager of 100 points win 100 points get to choose to buy a penalty up to that cost). An amount of time may be based on a cost of the penalty.

In some embodiments, rather than and/or in addition to a penalty, a benefit may be gained for a challenging player. Such a benefit may include, for example, stealing friends, gaining use of an account, gaining rights to a music file or movie or other media or software, gaining access to a membership, and so on. Some embodiments may include wagering to remove a penalty. For example, a challenge may be issued for the removal of a penalty vs a second penalty (e.g., a double or nothing penalty wager). As another example, a penalty for Player A to impose a ring tone penalty on Player B may be overcome by a penalty being awarded by Player B to impose a ring tone penalty on Player A.

Some embodiments may include queuing penalties that would override one another. For example, a ringtone penalty may be imposed on Player A and then if a second penalty for ringtone control is made on Player A, that second penalty may be queued until after the first penalty expires and/or is otherwise removed. In some embodiments, a later penalty may override an earlier penalty. In some embodiments, a wage may not be entered into that would impose an overriding penalty (e.g., a challenge may not be issued or accepted that would do so). Some embodiments may include determining penalty availability and/or queuing based on prior imposed penalties (e.g., by a gaming server, by a penalty imposing application on a device). Such information may be presented, and/or used to influence a presentation of information and/or to impose one or more penalties.

Some embodiments may include imposing a penalty in response to the outcome of a wager. For example, a gaming sever may identify the outcome of the wager and/or the penalty to a device and in response a penalty application may impose the penalty. Some embodiments may include allowing a challenged and/or challenging player to select when to impose the penalty. Some embodiments may include imposing the penalty in response to another overriding penalty ending (e.g., a penalty period for a similar penalty ending).

Example Structures

Figure 6:
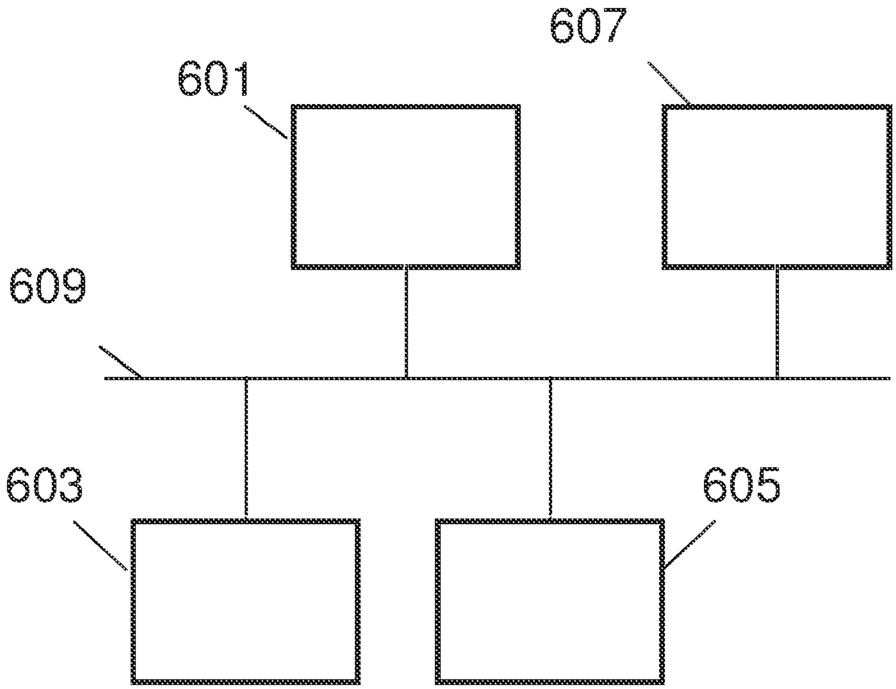
FIG. 6 shows an example apparatus that may facilitate wagering in some embodiments.

FIG. 6 illustrates an example structure that may be used in some embodiments. As indicated, some embodiments may include a gaming server 601, a first mobile device 603, a second mobile device 605, a location service 607, and a communication network 609. A gaming server may perform a method to enable gaming functionality as described herein. A mobile device may operate one or more applications to facilitate gaming services as described herein. A location service may determine location information to facilitate gaming services as described herein. One or more elements may communicate with one another through a communication network. U.S. application 61/604,115 describes some structures and/or applications that may be used in some embodiments and has already been incorporated herein by reference.

It should be recognized that various embodiments may include different, fewer, more, alternative, same, differently ordered, and so on elements and/or functionality.

Various embodiments may be used in any combination as desired and/or along with other elements or functionality as desired. It should be recognized that various embodiments are given as non-limiting examples only.

The following sections provide a guide to interpreting the present application.

II. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not necessarily limited to", unless expressly specified otherwise. Thus, for example, the sentence "the portfolio includes a red widget and a blue widget" means the portfolio includes the red widget and the blue widget but may include something else.

The term "consisting of" and variations thereof means "including and limited to", unless expressly specified otherwise. Thus, for example, the sentence "the portfolio consists of a red widget and a blue widget" means the portfolio includes the red widget and the blue widget but does not include anything else.

The term "compose" and variations thereof means "to make up the constituent parts of, component of, or member of", unless expressly specified otherwise. Thus, for example, the sentence "the red widget and the blue widget compose a portfolio" means the portfolio includes the red widget and the blue widget.

The term "exclusively compose" and variations thereof means "to make up exclusively the constituent parts of, to be the only components of or to be the only members of", unless expressly specified otherwise. Thus, for example, the sentence "the red widget and the blue widget exclusively compose a portfolio" means the portfolio consists of the red widget and the blue widget, and nothing else.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of" each of the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number, and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

III. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed and does not imply that numerical methods must be used and does not imply that an algorithm or process is used.

The term "determining" does not imply that any particular device must be used. For example, a computer need not necessarily perform the determining.

IV. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

V. Disclosed Examples and Terminology Are Not Limiting

Neither the Title (set forth at the beginning of the first page of the present application) nor the Abstract (set forth at the end of the present application) is to be taken as limiting in any way as the scope of the disclosed invention(s), is to be used in interpreting the meaning of any claim or is to be used in limiting the scope of any claim. An Abstract has been included in this application merely because an Abstract is required under 37 C.F.R. § 1.72(b).

The title of the present application and headings of sections provided in the present application are for convenience only and are not to be taken as limiting the disclosure in any way.

Numerous embodiments are described in the present application and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

All disclosed embodiments are not necessarily covered by the claims (even including all pending, amended, issued and canceled claims). In addition, an embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

VI. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random-access memory (DRAM), which typically constitutes the main memory.

Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth □, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VII. Continuing Applications

The present disclosure provides, to one of ordinary skill in the art, an enabling description of several embodiments and/or inventions. Some of these embodiments and/or inventions may not be claimed in the present application but may nevertheless be claimed in one or more continuing applications that claim the benefit of priority of the present application.

Applicants intend to file additional applications to pursue patents for subject matter that has been disclosed and enabled but not claimed in the present application.

VIII. 35 U.S.C. § 112, Paragraph 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general-purpose computer) that is programmed and/or configured with appropriate hardware to perform that function.

Also included is a computing device (e.g., a general-purpose computer) that is programmed and/or configured with appropriate hardware to perform that function via other algorithms as would be understood by one of ordinary skill in the art.

IX. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform".

X. Incorporation By Reference

Any patent, patent application or other document referred to herein is incorporated by reference into this patent application as part of the present disclosure, but only for purposes of written description and enablement in accordance with 35 U.S.C. § 112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference.

Any incorporation by reference does not, in and of itself, imply any endorsement of ratification of or acquiescence in any statements, opinions, arguments or characterizations contained in any incorporated patent, patent application or other document, unless explicitly specified otherwise in this patent application.

XI. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XII. Cards

Playing cards have been in existence for many years. Although there are many types of playing cards that are played in many different types of games, the most common type of playing cards consists of 52 cards, divided out into four different suits (namely Spades, Hearts, Diamonds and Clubs) which are printed or indicated on one side or on the face of each card. In the standard deck, each of the four suits of cards consists of 13 cards, numbered either two through ten, or lettered A (Ace), K (King), Q (Queen), or J (Jack), which is also printed or indicated on the face of each card. Each card will thus contain on its face a suit indication along with a number or letter indication. The King, Queen, and Jack usually also include some sort of design on the face of the card and may be referred to as picture cards. Other types of playing cards are described herein, but it should be recognized that various topics may apply to any, some, and/or all type of playing cards.

In some cases, the 52-card standard playing deck also contains a number of extra cards, sometimes referred to as jokers, that may have some use or meaning depending on the particular game being played with the deck. For example, if a card game includes the jokers, then if a player receives a joker in his "hand" he may use it as any card in the deck. If the player has the ten, jack, queen and king of Spades, along with a joker, the player would use the joker as an Ace of Spades. The player will then have a Royal Flush (ten through Ace of Spades).

Many different games can be played using a standard deck of playing cards. The game being played with the standard deck of cards may include other items, such as game boards, chips, etc., or the game being played may only need the playing card deck itself. In most of the games played using a standard deck of cards, a value is assigned to each card. The value may differ for different games.

Usually, the card value begins with the number two card as the lowest value and increases as the numbers increase through ten, followed in order of increasing value with the Jack, Queen, King and Ace. In some games the Ace may have a lower value than the two, and in games where a particular card is determined to be wild, or have any value, that card may have the greatest value of all. For example, in card games where deuces, or twos, are wild, the player holding a playing card containing a two can use that two as any other card, such that a nine and a two would be the equivalent of two nines.

Further, the four different suits indicated on the cards may have a particular value depending on the game. Under game rules where one suit, i.e., Spades, has more value than another suit, i.e., Hearts, the seven of Spades may have more value than the seven of Hearts.

It is easy to visualize that using the different card quantity and suit values, many different games can be played. In certain games, it is the combination of cards that one player obtains that determines whether or not that player has defeated the other player or players. Usually, the more difficult the combination is to obtain, the more value the combination has, and the player who obtains the more difficult combination (also taking into account the value of the cards) wins the game.

For instance in the game of Poker, each player may ultimately receive five cards. The player who obtains three cards having similar numbers on their face, i.e., the four of Hearts, four of Diamonds and four of Clubs, will defeat the player having only two cards with the same numerical value, i.e., the King of Spades and the King of Hearts. However, the player with five cards that all contain Clubs, commonly known as a flush, will defeat the player with the same three of a kind described above.

In many instances, a standard deck of playing cards is used to create gaming machines. In these gaming machines players insert coins and play certain card games, such as poker, using an imitation of standard playing cards on a video screen, in an attempt to win back more money than they originally inserted into the machine.

Another form of gambling using playing cards utilizes tables, otherwise known as table games. A table uses a table and a dealer, with the players sitting or standing around the table. The players place their bets on the table and the dealer deals the cards to each player. The number of cards dealt, or whether the cards are dealt face up or face down, will depend on the particular table game being played.

Further, an imitation or depiction of a standard playing card is used in many handheld electronic games, such as poker and blackjack, and in many computer games and Internet games. Using a handheld electronic game or a computer terminal that may or may not be connected to the Internet, a player receives the imitation playing cards and plays a card game either against the computer or against other players. Further, many of these games can be played on the computer in combination with gambling.

Also, there are many game shows that are broadcasted on television that use a deck of playing cards in the game play, in which the cards are usually enlarged or shown on a video screen or monitor for easy viewing. In these television game shows, the participants play the card game for prizes or money, usually against each other, with an individual acting as a host overseeing the action.

Also, there are lottery tickets that players purchase and play by "scratching off" an opaque layer to see if they have won money and prizes. The opaque layer prevents the player from knowing the results of the lottery ticket prior to purchasing and scratching off the layer. In some of these lottery tickets, playing cards are used under the opaque layer and the player may need to match a number of similar cards in order to win the prizes or money.

XIII. Rules of Card Games

Rules of Poker

In a basic poker game, which is played with a standard 52-card deck, each player is dealt five cards. All five cards in each player's hand are evaluated as a single hand with the presence of various combinations of the cards such as pairs, three-of-a-kind, straight, etc. Determining which combinations prevail over other combinations is done by reference to a table containing a ranking of the combinations. Rankings in most tables are based on the odds of each combination occurring in the player's hand. Regardless of the number of cards in a player's hand, the values assigned to the cards, and the odds, the method of evaluating all five cards in a player's hand remain the same.

Poker is a popular skill-based card game in which players with fully or partially concealed cards make wagers into a central pot. The pot is awarded to the player or players with the best combination of cards or to the player who makes an uncalled bet. Poker can also refer to video poker, a single-player game seen in casinos much like a slot machine, or to other games that use poker hand rankings.

Poker is played in a multitude of variations, but most follow the same basic pattern of play.

The right to deal each hand typically rotates among the players and is marked by a token called a 'dealer' button or buck. In a casino, a house dealer handles the cards for each hand, but a button (typically a white plastic disk) is rotated clockwise among the players to indicate a nominal dealer to determine the order of betting.

For each hand, one or more players are required to make forced bets to create an initial stake for which the players will contest. The dealer shuffles the cards, he cuts, and the appropriate number of cards are dealt to the players one at a time. Cards may be dealt either face-up or face-down, depending on the variant of poker being played. After the initial deal, the first of what may be several betting rounds begins. Between rounds, the players' hands develop in some way, often by being dealt additional cards or replacing cards previously dealt. At the end of each round, all bets are gathered into the central pot.

At any time during a betting round, if a player makes a bet, opponents are required to fold, call or raise. If one player bets and no opponents choose to match the bet, the hand ends immediately, the bettor is awarded the pot, no cards are required to be shown, and the next hand begins. The ability to win a pot without showing a hand makes bluffing possible. Bluffing is a primary feature of poker, one that distinguishes it from other vying games and from other games that make use of poker hand rankings.

At the end of the last betting round, if more than one player remains, there is a showdown, in which the players reveal their previously hidden cards and evaluate their hands. The player with the best hand according to the poker variant being played wins the pot.

The most popular poker variants are as follows:

Draw Poker

Players each receive five—as in five-card draw—or more cards, all of which are hidden. They can then replace one or more of these cards a certain number of times.

Stud Poker

Players receive cards one at a time, some being displayed to other players at the table. The key difference between stud and 'draw' poker is that players are not allowed to discard or replace any cards.

Community Card Poker

Players combine individually dealt cards with a number of "community cards" dealt face up and shared by all players. Two or four individual cards may be dealt in the most popular variations, Texas hold 'em and Omaha hold 'em, respectively.

Poker Hand Rankings

Straight Flush

A straight flush is a poker hand such as Q♠ J♠ 10♠ 9♠ 8♠, which contains five cards in sequence, all of the same suit. Two such hands are compared by their high card in the same way as are straights. The low ace rule also applies: 5♦ 4♦ 3♦ 2♦ A♦ is a 5-high straight flush (also known as a "steel wheel"). An ace-high straight flush such as A♣ K♣ Q♣ J♣ 10♣ is known as a royal flush and is the highest-ranking standard poker hand (excluding five of a kind).

EXAMPLES

7♥ 6♥ 5♥ 4♥ 3♥ beats 5♠ 4♠ 3♠ 2♠ A♠

J♣ 10♣ 9♣ 8♣ 7♣ ties J♦ 10♦ 9♦ 8♦ 7♦

Four of a Kind

Four of a kind, or quads, is a poker hand such as 9♣ 9♠ 9♦ 9♥ J♥, which contains four cards of one rank, and an unmatched card. It ranks above a full house and below a straight flush. Higher ranking quads defeat lower ranking ones. Between two equal sets of four of a kind (possible in wild card and community card games), the kicker determines the winner.

EXAMPLES

10♣ 10♦ 10♥ 10♠ 5♦ ("four tens" or "quad tens") defeats 6♦ 6♥ 6♠ 6♣ K♠ ("four sixes" or "quad sixes")

10♣ 10♦ 10♥ 10♠ Q♣ ("four tens, queen kicker") defeats 10♣ 10♦ 10♥ 10♠ 5♦ ("four tens with a five")

Full House

A full house, also known as a boat or a full boat, is a poker hand such as 3♣ 3♠ 3♦ 6♣ 6♥, which contains three matching cards of one rank, plus two matching cards of another rank. It ranks below a four of a kind and above a flush. Between two full houses, the one with the higher-ranking set of three wins. If two have the same set of three (possible in wild card and community card games), the hand with the higher pair wins. Full houses are described by the three of a kind (e.g. Q-Q-Q) and pair (e.g. 9-9), as in "Queens over nines" (also used to describe a two pair), "Queens full of nines" or simply "Queens full".

EXAMPLES

10♠ 10♥ 10♦ 4♠ 4♦ ("tens full") defeats 9♥ 9♣ 9♠ A♥A♣ ("nines full")

K♠ K♣ K♥ 3♦ 3♠ ("kings full") defeats 3♠ 3♥ 3♦ K♠ K♦ ("threes full")

Q♥ Q♦ Q♣ 8♥8♣ ("queens full of eights") defeats Q♥ Q♦ Q♣ 5♠ 5♥ ("queens full of fives")

Flush

A flush is a poker hand such as Q♣ 10♣ 7♣ 6♣ 4♣, which contains five cards of the same suit, not in rank sequence. It ranks above a straight and below a full house. Two flushes are compared as if they were high card hands. In other words, the highest-ranking card of each is compared to determine the winner; if both have the same high card, then the second-highest ranking card is compared, etc. The suits have no value: two flushes with the same five ranks of cards are tied. Flushes are described by the highest card, as in "queen-high flush".

EXAMPLES

A♥ Q♥ 10♥ 5♥ 3♥ ("ace-high flush") defeats K♠ Q♠ J♠ 9♠ 6♠ ("king-high flush")

A♦ K♦ 7♦ 6♦ 2♦ ("flush, ace-king high") defeats A♥ Q♥ 10♥ 5♥ 3♥ ("flush, ace-queen high")

Q♥ 10♥ 9♥ 5♥ 2♥ ("heart flush") ties Q♠ 10♠ 9♠ 5♠ 2♠ ("spade flush")

Straight

A straight is a poker hand such as Q♣ J♠ 10♠ 9♥ 8♥, which contains five cards of sequential rank of varying suits. It ranks above three of a kind and below a flush. Two straights are ranked by comparing the high card of each. Two straights with the same high card are of equal value and split any winnings (straights are the most commonly tied hands in poker, especially in community card games). Straights are described by the highest card, as in "queen-high straight" or "straight to the queen".

A hand such as A♣ K♣ Q♦ J♠ 10♠ is an ace-high straight and ranks above a king-high straight such as K♥ Q♠ J♥ 10♥ 9♦. But the ace may also be played as a 1-spot in a hand such as 5♠ 4♦ 3♦ 2♠ A♣, called a wheel or five-high straight, which ranks below the six-high straight 6♠ 5♣ 4♣ 3♥ 2♥. The ace may not "wrap around" or play both high and low in the same hand: 3♣ 2♦ A♠ K♠ Q♣ is not a straight, but just ace-high no pair.

EXAMPLES

8♠ 7♠ 6♥ 5♥ 4♠ ("eight-high straight") defeats 6♦ 5♠ 4♦ 3♥ 2♣ ("six-high straight")

8♠ 7♠ 6♥ 5♥ 4♠ ties 8♥ 7♦ 6♣ 5♣ 4♥

Three of a Kind

Three of a kind, also called trips, set or a prile, is a poker hand such as 2♦ 2♠ 2♥ K♠ 6♠, which contains three cards of the same rank, plus two unmatched cards. It ranks above two pair and below a straight. Higher ranking three of a kind defeat lower ranking three of a kinds. If two hands have the same rank three of a kind (possible in games with wild cards or community cards), the kickers are compared to break the tie.

EXAMPLES

8♠ 8♥ 8♦ 5♠ 3♣ ("three eights") defeats 5♣ 5♥ 5♦ Q♦ 10♣ ("three fives")

8♠ 8♥ 8♦ A♣ 2♦ ("three eights, ace kicker") defeats 8♠ 8♥ 8♦ 5♠ 3♣ ("three eights, five kicker")

Two Pair

A poker hand such as J♥ J♣ 4♣ 4♠ 9♠, which contains two cards of the same rank, plus two cards of another rank (that match each other but not the first pair), plus one unmatched card, is called two pair. It ranks above one pair and below three of a kind. Between two hands containing two pair, the higher-ranking pair of each is first compared, and the higher pair wins. If both have the same top pair, then the second pair of each is compared. Finally, if both hands have the same two pairs, the kicker determines the winner. Two pair are described by the higher pair (e.g., K♥ K♣) and the lower pair (e.g., 9♠ 9♦), as in "Kings over nines", "Kings and nines" or simply "Kings up".

EXAMPLES

K♥ K♦ 2♣ 2♦ J♥ ("kings up") defeats J♦ J♠ 10♠ 10♣ 9♠ ("jacks up")

9♣ 9♦ 7♦ 7♠ 6♥ ("nines and sevens") defeats 9♥ 9♠ 5♥ 5♦ K♣ ("nines and fives")

4♠ 4♣ 3♠ 3♥ K♦ ("fours and threes, king kicker") defeats 4♥ 4♦ 3♦ 3 10♠ ("fours and threes with a ten")

One Pair

One pair is a poker hand such as 4♥ 4♠ K♠ 10♦ 5♠, which contains two cards of the same rank, plus three unmatched cards. It ranks above any high card hand, but below all other poker hands. Higher ranking pairs defeat lower ranking pairs. If two hands have the same rank of pair, the non-paired cards in each hand (the kickers) are compared to determine the winner.

EXAMPLES

10♣ 10♠ 6♠ 4♥ 2♥ ("pair of tens") defeats 9♥ 9♣ A♥ Q♦ 10♦ ("pair of nines")

10♥ 10♦ J♦ 3♥ 2♣ ("tens with jack kicker") defeats 10♣ 10♠ 6♠ 4♥ 2♥ ("tens with six kicker")

2♦ 2♥ 8♠ 5♣ 4♣ ("deuces, eight-five-four") defeats 2♣ 2♠ 8♣ 5♥ 3♥ ("deuces, eight-five-three")

High Card

A high-card or no-pair hand is a poker hand such as K♥ J♠ 8♠ 7♦ 3♠, in which no two cards have the same rank, the five cards are not in sequence, and the five cards are not all the same suit. It can also be referred to as "nothing" or "garbage," and many other derogatory terms. It ranks below all other poker hands. Two such hands are ranked by comparing the highest-ranking card; if those are equal, then the next highest-ranking card; if those are equal, then the third highest ranking card, etc. No-pair hands are described by the one or two highest cards in the hand, such as "king high" or "ace-queen high", or by as many cards as are necessary to break a tie.

EXAMPLES

A♦ 10♦ 9♠ 5♣ 4♣ ("ace high") defeats K♣ Q♦ J♣ 8♥ 7♥ ("king high")

A♣ Q♣ 7♦ 5♥ 2♣ ("ace-queen") defeats A♦ 10♦ 9♠ 5♣ 4♣ ("ace-ten")

7♠ 6♣ 5♣ 4♦ 2♥ ("seven-six-five-four") defeats 7♣ 6♦ 5♦ 3♥ 4♣ ("seven-six-five-three")

Decks Using a Bug

The use of joker as a bug creates a slight variation of game play. When a joker is introduced in standard poker games it functions as a fifth ace or can be used as a flush or straight card (though it can be used as a wild card too). Normally casino draw poker variants use a joker, and thus the best possible hand is five of a kind, as in A♥ A♦ A♣ A♠ Joker.

Rules of Caribbean Stud

Caribbean Stud™ poker may be played as follows. A player and a dealer are each dealt five cards. If the dealer has a poker hand having a value less than Ace-King combination or better, the player automatically wins. If the dealer has a poker hand having a value of an Ace-King combination or better, then the higher of the player's or the dealer's hand wins. If the player wins, he may receive an additional bonus payment depending on the poker rank of his hand. In the commercial play of the game, a side bet is usually required to allow a chance at a progressive jackpot. In Caribbean Stud™ poker, it is the dealer's hand that must qualify. As the dealer's hand is partially concealed during play (usually only one card, at most) is displayed to the player before player wagering is complete), the player must always be aware that even ranked player hands can lose to a dealer's hand and no bonus will be paid out unless the side bet has been made, and then usually only to hands having a rank of a flush or higher.

Rules of Blackjack

Some versions of Blackjack are now described. Blackjack hands are scored according to the point total of the cards in the hand. The hand with the highest total wins as long as it is 21 or less. If the total is greater than 21, it is a called a "bust." Numbered cards 2 through 10 have a point value equal to their face value, and face cards (i.e., Jack, Queen and King) are worth 10 points. An Ace is worth 11 points unless it would bust a hand, in which case it is worth 1 point. Players play against the dealer and win by having a higher point total no greater than 21. If the player busts, the player loses, even if the dealer also busts. If the player and dealer have hands with the same point value, this is called a "push," and neither party wins the hand.

After the initial bets are placed, the dealer deals the cards, either from one or more, but typically two, hand-held decks of cards, or from a "shoe" containing multiple decks of cards, generally at least four decks of cards, and typically many more. A game in which the deck or decks of cards are hand-held is known as a "pitch" game. "Pitch" games are generally not played in casinos. When playing with more than one deck, the decks are shuffled together in order to make it more difficult to remember which cards have been dealt and which have not. The dealer deals two cards to each player and to himself. Typically, one of the dealer's two cards is dealt face-up so that all players can see it, and the other is face down. The face-down card is called the "hole card." In a European variation, the "hole card" is dealt after all the players' cards are dealt and their hands have been played. The players' cards are dealt face up from a shoe and face down if it is a "pitch" game.

A two-card hand with a point value of 21 (i.e., an Ace and a face card or a 10) is called a "Blackjack" or a "natural" and wins automatically. A player with a "natural" is conventionally paid 3:2 on his bet, although in 2003 some Las Vegas casinos began paying 6:5, typically in games with only a single deck.

Once the first two cards have been dealt to each player and the dealer, the dealer wins automatically if the dealer has a "natural" and the player does not. If the player has a "natural" and the dealer does not, the player automatically wins. If the dealer and player both have a "natural," neither party wins the hand.

If neither side has a "natural," each player completely plays out their hand; when all players have finished, the dealer plays his hand.

The playing of the hand typically involves a combination of four possible actions "hitting," "standing," "doubling down," or "splitting" his hand. Often another action called "surrendering" is added. To "hit" is to take another card. To "stand" is to take no more cards. To "double down" is to double the wager, take precisely one more card and then "stand." When a player has identical value cards, such as a pair of 8s, the player can "split" by placing an additional wager and playing each card as the first card in two new hands. To "surrender" is to forfeit half the player's bet and give up his hand. "Surrender" is not an option in most casino games of Blackjack. A player's turn ends if he "stands," "busts" or "doubles down." If the player "busts," he loses even if the dealer subsequently busts. This is the house advantage.

After all players have played their hands, the dealer then reveals the dealer's hole card and plays his hand. According to house rules (the prevalent casino rules), the dealer must hit until he has a point total of at least 17, regardless of what the players have. In most casinos, the dealer must also hit on a "soft" 17 (e.g., an Ace and 6). In a casino, the Blackjack table felt is marked to indicate if the dealer hits or stands on a soft 17. If the dealer busts, all remaining players win. Bets are normally paid out at odds of 1:1.

Four of the common rule variations are one card split Aces, early surrender, late surrender and double-down restrictions. In the first variation, one card is dealt on each Ace and the player's turn is over. In the second, the player has the option to surrender before the dealer checks for Blackjack. In the third, the player has the option to surrender after the dealer checks for Blackjack. In the fourth, doubling-down is only permitted for certain card combinations.

Insurance

Insurance is a commonly-offered betting option in which the player can hedge his bet by wagering that the dealer will win the hand. If the dealer's "up card" is an Ace, the player is offered the option of buying Insurance before the dealer checks his "hole card." If the player wishes to take Insurance, the player can bet an amount up to half that of his original bet. The Insurance bet is placed separately on a special portion of the table, which is usually marked with the words "Insurance Pays 2:1." The player buying Insurance is betting that the dealer's "hole card" is one with a value of 10 (i.e., a 10, Jack, Queen or King). Because the dealer's up card is an Ace, the player who buys Insurance is betting that the dealer has a "natural."

If the player originally bets $10 and the dealer shows an Ace, the player can buy Insurance by betting up to $5. Suppose the player makes a $5 Insurance bet and the player's hand with the two cards dealt to him totals 19. If the dealer's hole card is revealed to be a 10 after the Insurance betting period is over (the dealer checks for a "natural" before the players play their hands), the player loses his original $10 bet, but he wins the $5 Insurance bet at odds of 2:1, winning $10 and therefore breaking even. In the same situation, if the dealer's hole card is not one with a value of ten, the player immediately loses his $5 Insurance bet. But if the player chooses to stand on 19, and if the dealer's hand has a total value less than 19, at the end of the dealer's turn, the player wins his original $10 bet, making a net profit of $5. In the same situation, if the dealer's hole card is not one with a value of ten, again the player will immediately lose their $5 Insurance bet, and if the dealer's hand has a total value greater than the player's at the end of both of their turns, for example the player stood on 19 and the dealer ended his turn with 20, the player loses both his original $10 bet and his $5 Insurance bet Basic Strategy Blackjack players can increase their expected winnings by several means, one of which is "basic strategy." "Basic strategy" is simply something that exists as a matter of general practice; it has no official sanction. The "basic strategy" determines when to hit and when to stand, as well as when doubling down or splitting in the best course. Basic strategy is based on the player's point total and the dealer's visible card. Under some conditions (e.g., playing with a single deck according to downtown Las Vegas rules) the house advantage over a player using basic strategy can be as low as 0.16%. Casinos offering options like surrender and double-after-split may be giving the player using basic strategy a statistical advantage and instead rely on players making mistakes to provide a house advantage.

A number of optional rules can benefit a skilled player, for example: if doubling down is permitted on any two-card hand other than a natural; if "doubling down" is permitted after splitting; if early surrender (forfeiting half the bet against a face or Ace up card before the dealer checks for Blackjack) is permitted; if late surrender is permitted; if re-splitting Aces is permitted (splitting when the player has more than two cards in their hand, and has just been dealt a second ace in their hand); if drawing more than one card against a split Ace is permitted; if five or more cards with a total no more than 21 is an automatic win (referred to as "Charlies").

Other optional rules can be detrimental to a skilled player. For example: if a "natural" pays less than 3:2 (e.g., Las Vegas Strip single-deck Blackjack paying out at 6:5 for a "natural"); if a hand can only be split once (is re-splitting possible for other than aces); if doubling down is restricted to certain totals (e.g., 9 11 or 10 11); if Aces may not be re-split; if the rules are those of "no-peek" (or European) Blackjack, according to which the player loses hands that have been split or "doubled down" to a dealer who has a "natural' (because the dealer does not check for this automatically winning hand until the players had played their hands); if the player loses ties with the dealer, instead of pushing where neither the player or the dealer wins and the player retains their original bet.

Card Counting

Unlike some other casino games, in which one play has no influence on any subsequent play, a hand of Blackjack removes those cards from the deck. As cards are removed from the deck, the probability of each of the remaining cards being dealt is altered (and dealing the same cards becomes impossible). If the remaining cards have an elevated proportion of 10-value cards and Aces, the player is more likely to be dealt a natural, which is to the player's advantage (because the dealer wins even money when the dealer has a natural, while the player wins at odds of 3:2 when the player has a natural). If the remaining cards have an elevated proportion of low-value cards, such as 4s, 5s and 6s, the player is more likely to bust, which is to the dealer's advantage (because if the player busts, the dealer wins even if the dealer later busts).

The house advantage in Blackjack is relatively small at the outset. By keeping track of which cards have been dealt, a player can take advantage of the changing proportions of the remaining cards by betting higher amounts when there is an elevated proportion of 10-value cards and Aces and by better lower amounts when there is an elevated proportion of low-value cards. Over time, the deck will be unfavorable to the player more often than it is favorable, but by adjusting the amounts that he bets, the player can overcome that inherent disadvantage. The player can also use this information to refine basic strategy. For instance, basic strategy calls for hitting on a 16 when the dealer's up card is a 10, but if the player knows that the deck has a disproportionately small number of low-value cards remaining, the odds may be altered in favor of standing on the 16.

There are a number of card-counting schemes, all dependent for their efficacy on the player's ability to remember either a simplified or detailed tally of the cards that have been played. The more detailed the tally, the more accurate it is, but the harder it is to remember. Although card counting is not illegal, casinos will eject or ban successful card counters if they are detected.

Shuffle tracking is a more obscure, and difficult, method of attempting to shift the odds in favor of the player. The player attempts to track groups of cards during the play of a multi-deck shoe, follow them through the shuffle, and then looks for the same group to reappear from the new shoe, playing and betting accordingly.

XIV. Casino Countermeasures

Some methods of thwarting card counters include using a large number of decks. Shoes containing 6 or 8 decks are common. The more cards there are, the less variation there is in the proportions of the remaining cards and the harder it is to count them. The player's advantage can also be reduced by shuffling the cards more frequently, but this reduces the amount of time that can be devoting to actual play and therefore reduces the casino profits. Some casinos now use shuffling machines, some of which shuffle one set of cards while another is in play, while others continuously shuffle the cards. The distractions of the gaming floor environment and complimentary alcoholic beverages also act to thwart card counters. Some methods of thwarting card counters include using varied payoff structures, such Blackjack payoff of 6:5, which is more disadvantageous to the player than the standard 3:2 Blackjack payoff.

XV. Video Wagering Games

Video wagering games are set up to mimic a table game using adaptations of table games rules and cards.

In one version of video poker the player is allowed to inspect five cards randomly chosen by the computer. These cards are displayed on the video screen and the player chooses which cards, if any, that he or she wishes to hold. If the player wishes to hold all of the cards, i.e., stand, he or she presses a STAND button. If the player wishes to hold only some of the cards, he or she chooses the cards to be held by pressing HOLD keys located directly under each card displayed on the video screen. Pushing a DEAL button after choosing the HOLD cards automatically and simultaneously replaces the unchosen cards with additional cards which are randomly selected from the remainder of the deck. After the STAND button is pushed, or the cards are replaced, the final holding is evaluated by the game machine's computer and the player is awarded either play credits or a coin payout as determined from a payoff table. This payoff table is stored in the machine's computer memory and is also displayed on the machine's screen. Hands with higher poker values are awarded more credits or coins. Very rare poker hands are awarded payoffs of 800-to-1 or higher.

XVI. Apparatus for Playing Over a Communications System

In some embodiments, there is a plurality of player units 40-1 to **40-*n* which are coupled via a communication system 41, such as the Internet, with a game playing system comprising an administration unit 42, a player register 43, and a game unit 45. Each unit 40** is typically a personal computer with a display unit and control means (a keyboard and a mouse).

When a player logs on to the game playing system, their unit 40 identifies itself to the administration unit. The system holds the details of the players in the register 43, which contains separate player register units 44-1 to **44-*n*** for all the potential players, i.e., for all the members of the system.

Once the player has been identified, the player is assigned to a game unit 45. The game unit contains a set of player data units 46-1 to 46-6, a dealer unit 47, a control unit 48, and a random dealing unit 49.

Up to seven players can be assigned to the game unit 45. There can be several such units, as indicated, so that several games can be played at the same time if there are more than seven members of the system logged on at the same time. The assignment of a player unit 40 to a player data unit 46 may be arbitrary or random, depending on which player data units 46 and game units 45 are free. Each player data unit 46 is loaded from the corresponding player register unit 44 and also contains essentially the same details as the corresponding player unit 40 and is in communication with the player unit 40 to keep the contents of the player unit and player data unit updated with each other. In addition, the appropriate parts of the contents of the other player data units 46 and the dealer unit 47 are passed to the player unit 40 for display.

The logic unit 48 of the game unit 45 steps the game unit through the various stages of the play, initiating the dealer actions and awaiting the appropriate responses from the player units 40. The random dealing unit 49 deals cards essentially randomly to the dealer unit 47 and the player data units 46. At the end of the hand, the logic unit passes the results of the hand, i.e., the wins and/or losses, to the player data units 46 to inform the players of their results. The administrative unit 42 also takes those results and updates the player register units 44 accordingly.

The player units 40 are arranged to show a display. To identify the player, the player's position is highlighted. As play proceeds, so the player selects the various boxes, enters bets in them, and so on, and the results of those actions are displayed. As the cards are dealt, a series of overlapping card symbols is shown in the Bonus box. At the option of the player, the cards can be shown in a line below the box, and similarly for the card dealt to the dealer. At the end of the hand, a message is displayed informing the player of the results of their bets, i.e., the amounts won or lost.

XVII. Alternative Technologies

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

XVIII. References

The following patents and patent applications are hereby incorporated by reference herein for all purposes: U.S. Pat. Nos. 6,579,181, 6,299,536, 6,093,103, 5,941,769, 7,114,718, U.S. patent application Ser. No. 10/622,321, U.S. Pat. Nos. 4,515,367, 5,000,453, 7,137,630, and 7,137,629.

The invention claimed is:

1. A method comprising:

determining, by at least one processor, that a first mobile device associated with a first player is located in a first jurisdiction that does not permit gaming for monetary winnings;

enabling, by the at least one processor, point gaming and disabling monetary gaming from the first mobile device;

receiving, by the at least one processor, from a graphical user interface of the first mobile device, a challenge by the first player, in which the challenge identifies an amount of points and a second mobile device of a second player against whom to place the challenge;

identifying, by the at least one processor, the challenge to the second player;

receiving, by the at least one processor, an acceptance of the challenge from the second mobile device of the second player; and forming, by the at least one processor, a game over a communication network between the first mobile device of the first player and the second mobile device of the second player based on the challenge.

2. The method of claim 1, further comprising:

adjusting, by the at least one processor, points in an account of a winning player of the game in response to determining an outcome of the challenge;

determining, by the at least one processor, that the first mobile device is located in a second jurisdiction that permits gaming for monetary winnings; and switching functionality of the first mobile device to disable point gaming and enable monetary gaming from the first mobile device.

3. The method of claim 2, comprising:

receiving, by the at least one processor, a second challenge by the first player, in which the second challenge identifies a penalty and the second player against whom to place the challenge, in which the penalty is neither a monetary penalty nor a point-based penalty;

in response to receiving the second challenge, identifying, by the at least one processor, the second challenge to the second player;

receiving, by the at least one processor, a second acceptance of the second challenge from the second player;

in response to receiving the second acceptance, forming, by the at least one processor, a second game between the first player and the second player based on the second challenge; and imposing, by the at least one processor, the penalty on a losing player of the second challenge in response to determining a second outcome of the second challenge.

4. The method of claim 3, in which the penalty includes a change to a ring tone of a mobile device whose player lost the challenge.

5. The method of claim 3, in which the penalty includes a change in a background image of a mobile device whose player lost the challenge.

6. The method of claim 3, in which the penalty includes a change to a social network of the losing player.

7. The method of claim 3, in which the penalty includes a restriction on internet traffic of a mobile device whose player lost the challenge.

8. The method of claim 3, in which the penalty includes a change to a voicemail of a mobile device whose player lost the challenge.

9. The method of claim 3, in which the second challenge identifies a time period during which the penalty is to be imposed, and in which imposing the penalty on the losing player includes imposing the penalty for the time period.

10. The method of claim 3, in which imposing the penalty on the losing player includes queuing the penalty for imposition until a previously imposed penalty imposed on the losing player has expired.

11. The method of claim 3, in which the second challenge identifies a benefit that is neither a monetary benefit nor a point based benefit; and the method includes imparting the benefit on the winning player of the second challenge in response to determining the second outcome of the second challenge.

12. The method of claim 11, in which the benefit affects an operation of a mobile device whose player won the challenge.

13. The method of claim 11, in which the benefit includes removing a previously imposed penalty from a computing device of the winning player.

14. The method of claim 11, in which the benefit includes access to media.

15. An apparatus comprising:

a memory;

at least one processor configured to:

determine that a first mobile device associated with a first player is located in a first jurisdiction that permits gaming for monetary winnings;

enable point gaming and disable monetary gaming from the first mobile device;

receive, from a graphical user interface of the first mobile device, a challenge by the first player, in which the challenge identifies an amount of points and a second mobile device of a second player against whom to place the challenge;

identify the challenge to the second mobile device of the second player;

receive an acceptance of the challenge from a graphical user interface of the second mobile device of the second player; and form a game over a communication network between the first mobile device of the first player and the second mobile device of the second player based on the challenge.

16. The apparatus of claim 15, wherein the at least one processor is further configured to:

adjust points in an account of a winning player of the challenge in response to determining an outcome of the challenge;

determine that the first mobile device is located in a second jurisdiction that is designated as a monetary gaming area; and switch functionality of the first mobile device to disable point gaming and to enable monetary gaming from the first mobile device.

17. The apparatus of claim 16, in which the at least one processor is further configured to:

receive from the first mobile device a second challenge by the first player, in which the second challenge identifies a penalty and the second player against whom to place the challenge, in which the penalty is neither a monetary penalty nor a point-based penalty;

in response to receiving the second challenge, identify the second challenge to the second player;

receive a second acceptance of the second challenge from the second player;

in response to receiving the second acceptance, form a second game between the first player and the second player based on the second challenge; and impose the penalty on a losing player of the second challenge in response to determining a second outcome of the second challenge.

18. The apparatus of claim 17, in which the penalty affects an operation of a mobile device whose player lost the challenge.

19. The apparatus of claim 17, in which the penalty includes a change to a ring tone of a mobile device whose player lost the challenge.

20. The apparatus of claim 17, in which the second challenge identifies a benefit that is neither a monetary benefit nor a point based benefit; and in which the at least one processor is further configured to impart the benefit on a mobile device whose player won the second challenge in response to determining the second outcome of the second challenge.

* * * * *